United States Patent [19]

Yasuda et al.

[11] Patent Number: 5,675,072

[45] Date of Patent: Oct. 7, 1997

[54] COMBUSTION CONDITION DETECTOR FOR INTERNAL COMBUSTION ENGINE

[75] Inventors: Yukio Yasuda; Wataru Fukui; Yasuhiro Takahashi, all of Hyogo, Japan

[73] Assignee: Mitsubishi Denki Kabushiki Kaisha, Tokyo, Japan

[21] Appl. No.: 579,670

[22] Filed: Dec. 28, 1995

[30] Foreign Application Priority Data

Jun. 29, 1995 [JP] Japan .................. 7-163869

[51] Int. Cl.$^6$ ........................... G01M 15/00
[52] U.S. Cl. ................ 73/35.08; 73/116; 324/378; 324/379
[58] Field of Search ............... 324/378, 379, 324/381, 382, 383, 402; 73/35.08, 116, 117.2, 117.3, 118.1; 364/431.05, 431.04; 123/425

[56] References Cited

U.S. PATENT DOCUMENTS

| | | | |
|---|---|---|---|
| 3,551,800 | 12/1970 | Widmer | 324/383 |
| 4,608,536 | 8/1986 | Jacobs et al. | 73/116 |
| 4,987,771 | 1/1991 | Iwata | 73/117.3 |
| 5,207,200 | 5/1993 | Iwata | 123/425 |
| 5,222,393 | 6/1993 | Ohsawa | 73/117.3 |
| 5,230,240 | 7/1993 | Ohsawa et al. | 73/116 |
| 5,343,844 | 9/1994 | Fukui et al. | 73/116 |
| 5,347,855 | 9/1994 | Miyata et al. | 73/116 |
| 5,365,910 | 11/1994 | Miyata et al. | 73/116 |
| 5,387,253 | 2/1995 | Remboski et al. | 73/117.3 |
| 5,387,870 | 2/1995 | Knapp et al. | 364/431.04 |
| 5,452,603 | 9/1995 | Asano et al. | 73/116 |

FOREIGN PATENT DOCUMENTS 2-104978  4/1990  Japan ................ F02P 17/00

*Primary Examiner*—George M. Dombroske
*Attorney, Agent, or Firm*—Sughrue, Mion, Zinn, Macpeak and Seas

[57] ABSTRACT

To correctly sense combusting conditions of an internal combustion engine, an ion current caused by combustion is detected. A combusting condition detecting apparatus for an internal combustion engine comprises a bias voltage generating circuit for applying a bias voltage to an ignition plug provided in a cylinder of the internal combustion engine; an ion current-to-voltage converting circuit for converting an ion current produced in response to the bias voltage into a voltage corresponding to the ion current; a filter circuit for reducing or removing a pulsatory signal upon reception of the voltage signal outputted from the ion current-to-voltage converting circuit; a sensing period setting circuit for defining a predetermined combusting condition sensing period based upon a filter signal outputted from the filter circuit; and an AC component detecting circuit for detecting an AC (alternating current) component in a specific frequency region during the sensing period from the voltage signal derived from the ion current-to-voltage converting circuit.

4 Claims, 10 Drawing Sheets

COMBUSTION CONDITION DETECTOR FOR INTERNAL COMBUSTION ENGINE

BACKGROUND OF THE INVENTION

1. Field of the Invention

The present invention relates to a combustion condition detector for detecting combustion conditions of an internal combustion engine by detecting ion currents produced by combustion of the internal combustion engine.

2. Description of the Related Art

In an internal combustion engine, a gas mixture made of air and a fuel conducted into a combustion chamber (referred to as a "cylinder" hereinafter) is compressed by employing a piston, and then is combusted by way of an electric spark produced by applying a high voltage to an ignition plug provided within the same cylinder. Thus, power is derived from the internal combustion engine.

When combustion of the gas mixture is performed in the cylinder, molecules present in the cylinder are ionized. When a high voltage is applied to an ion current detecting electrode provided within the cylinder under an ionization condition, a current may flow because of ions having electric charge. This current is called as an ion current. Since an ion current is sensibly changed in response to combustion conditions within a cylinder, the combustion conditions can be sensed by detecting the ion current. Unexamined Japanese Patent Publication 2-104978 (1990) describes such a system that the ignition plug is employed as the ion current detecting electrode. This system may sense that the normal combustion is not performed (namely, a misfire condition) based on the ion current amount just after the ignition operation.

As other conventional well-known sensing methods for detecting the combustion conditions of the internal combustion engine, a vibration detector mounted on the cylinder block of the internal combustion engine is employed so as to sense any abnormal vibrations caused from an abnormal combustion (knocking phenomenon etc.) of the internal combustion engine.

When the above-explained conventional combusting condition sensing method by the vibration detector is applied to the multi-cylinder type engine, a plurality of such vibration detectors must be mounted on each of these cylinders in order to uniformly detect the mechanical vibrations caused by the knocking phenomenon occurred in the plural cylinders. This increases cost. There is another problem that since the vibrations from the engine mechanical system (vibrations of air exhausting valves) are also detected, no clear discrimination can be made between the mechanical system vibrations and the knocking vibrations.

Thus, considering an ion current when the knocking phenomenon occurs, it could be recognized that a waveform of this ion current is vibrated when the combustion vibration is caused by the knocking phenomenon. Therefore, if the ion current is detected by considering this phenomenon to thereby sense the knocking phenomenon, then the combustion conditions in the cylinder can be directly detected, as compared with the method for detecting the vibrations by the vibration detector. Accordingly, a combustion condition detecting apparatus for an internal combustion engine may be arranged with high precision and low cost.

However, when such a combustion condition detecting apparatus for an internal combustion engine is embodied, it could be recognized that as represented in FIG. 1, the pulsatory noise would be superimposed on the ion current-to-voltage conversion signal waveform when the primary current is supplied to the ignition coil and interrupted. There is a further problem to clearly discriminate this pulsatory noise from the vibration waveforms by the knocking phenomenon, resulting in erroneous detections.

It could also be recognized that since the magnitude of the ion current is considerably changed in response to the revolution speeds of the engine, it is very difficult to extract the combustion vibration signals caused by the knocking phenomenon over the entire engine revolution range.

That is, since the ion current-to-voltage converting rate is fixed in the conventional combustion condition detecting circuit, the amplitude of the ion current-to-voltage conversion waveform when the engine revolution speed is low becomes small, as shown in "S1" of FIG. 2. (S11 shows a vibration waveform portion caused by knocking phenomenon). To the contrary, the amplitude of the ion current-to-voltage conversion waveform when the engine revolution speed is high becomes large, as represented in "S2" of FIG. 2. (S21 denotes a vibration waveform portion caused by knocking phenomenon. As shown by "S2'", it is not possible to obtain such an ion current-to-voltage conversion value higher than the circuit voltage during the high engine revolution speed, so that the knocking phenomenon could not be detected during this high engine revolution speed. When the ion current-to-voltage converting rate is set so as to be able to detect the knocking phenomenon during the high engine revolution speed, the ion current-to-voltage conversion value during the low engine revolution speed becomes very small. Therefore, it is difficult to detect the knocking phenomenon during the low engine revolution speed.

SUMMARY OF THE INVENTION

The present invention has been made to solve the above-described problems, and therefore has an object to provide a low-cost combustion condition detecting apparatus for an internal combustion engine, capable of sensing a knocking phenomenon based upon an ion current, while achieving high detection precision.

Another object of the present invention is to provide a combustion condition detecting apparatus for an internal combustion engine, capable of sensing a knocking phenomenon over an entire revolution speed range of the engine.

Another object of the present invention is to provide a combustion condition detecting apparatus for an internal combustion engine, capable of sensing a knocking phenomenon having a simple and low-cost structure even in a multi-cylinder engine.

A further object of the present invention is to provide a combustion condition detecting apparatus for an internal combustion engine, equipped with both a knocking sensing function and a misfire judging function without having a complex arrangement.

A combustion condition detecting apparatus for an internal combustion engine, according to the present invention, comprises: bias voltage generating circuit for applying a bias voltage to an ignition plug provided in a cylinder of the internal combustion engine; an ion current-to-voltage converting circuit for converting an ion current produced in response to the bias voltage into a voltage corresponding to the ion current; a filter circuit for reducing removing a pulsatory signal upon reception of the voltage signal outputted from the ion current-to-voltage converting circuit; a sensing period setting circuit for defining a predetermined combusting condition sensing period based upon a filter signal outputted from the filter circuit; and an AC component detecting circuit for detecting an AC (alternating current) component in a specific frequency region during the sensing period from the voltage signal derived from the ion current-to-voltage converting circuit.

Further, according to the present invention, the ion current-to-voltage circuit can vary at least a gain of the voltage signal supplied to the AC component detecting circuit in response to a low frequency component value of the ion current.

In the combustion condition detecting apparatus, according to the present invention, a plurality of the ion current-to-voltage converting circuits are provided in correspondence with either different cylinders or a cylinder group.

In the combustion condition detecting apparatus, according to the present invention, the sensing period setting circuit defines a combustion condition sensing period by detecting a period during which the output signal from the filter circuit has a value higher than, or equal to a preselected value, and also outputs a misfire judging signal based upon whether or not the output signal from the filter circuit becomes higher than, or equal to the preselected value.

In accordance with the combustion condition detecting apparatus for the internal combustion engine, according to the present invention, the combustion condition is sensed within only a preselected sensing period after combustion based upon the ion current-to-voltage conversion signal from which the pulsatory noise signal has been removed by the filter circuit.

Also, at least the gain of the output signal supplied to the AC component detecting circuit is variable in response to the low frequency component of the ion current, and thus the ion current-to-voltage conversion waveforms can be continuously obtained within the circuit voltage range from the high engine revolution speed to the low engine revolution speed.

Also, the combustion conditions even for the plural cylinders can be sensed by employing a single ion current-to-voltage converting circuit.

The combustion condition detecting apparatus according to the present invention can output the misfire judging signal in response to the output signal from the filter circuit.

DETAILED DESCRIPTION OF THE PREFERRED EMBODIMENTS

First Embodiment

Figure 1:
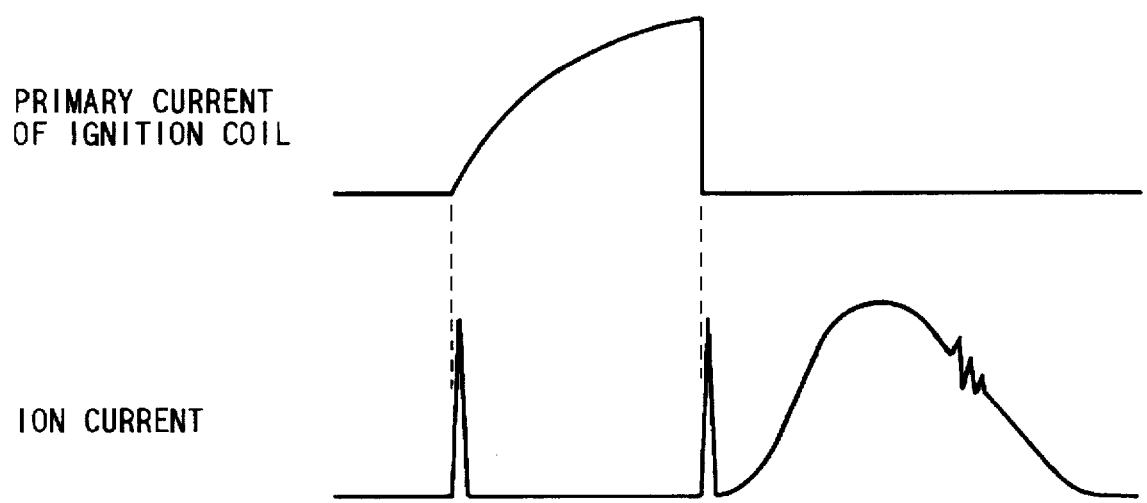
FIG. 1 is a waveform chart for indicating a relative relationship between a primary current and an ion current.
Figure 2:
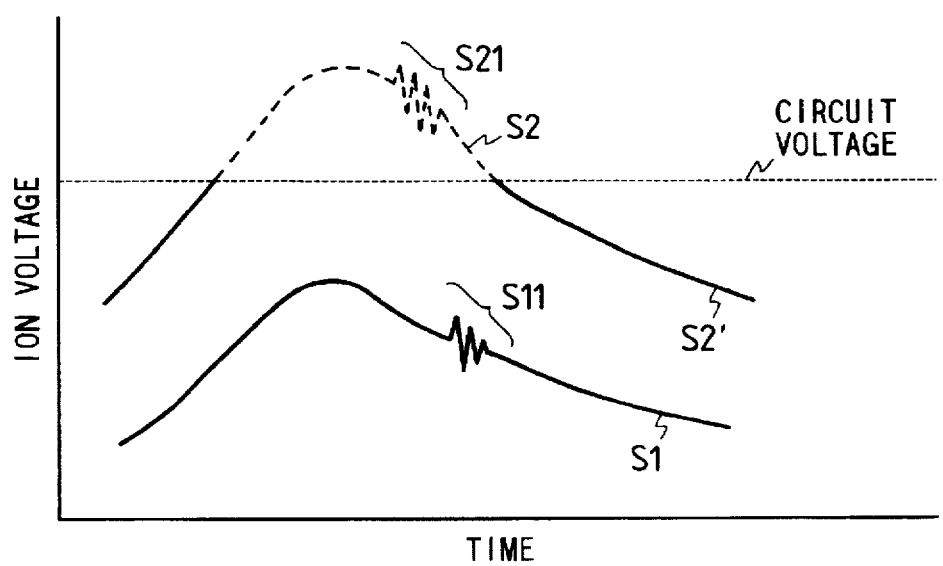
FIG. 2 is a waveform chart for showing the output signal of the conventional ion current-to-voltage converting circuit.
Figure 3:
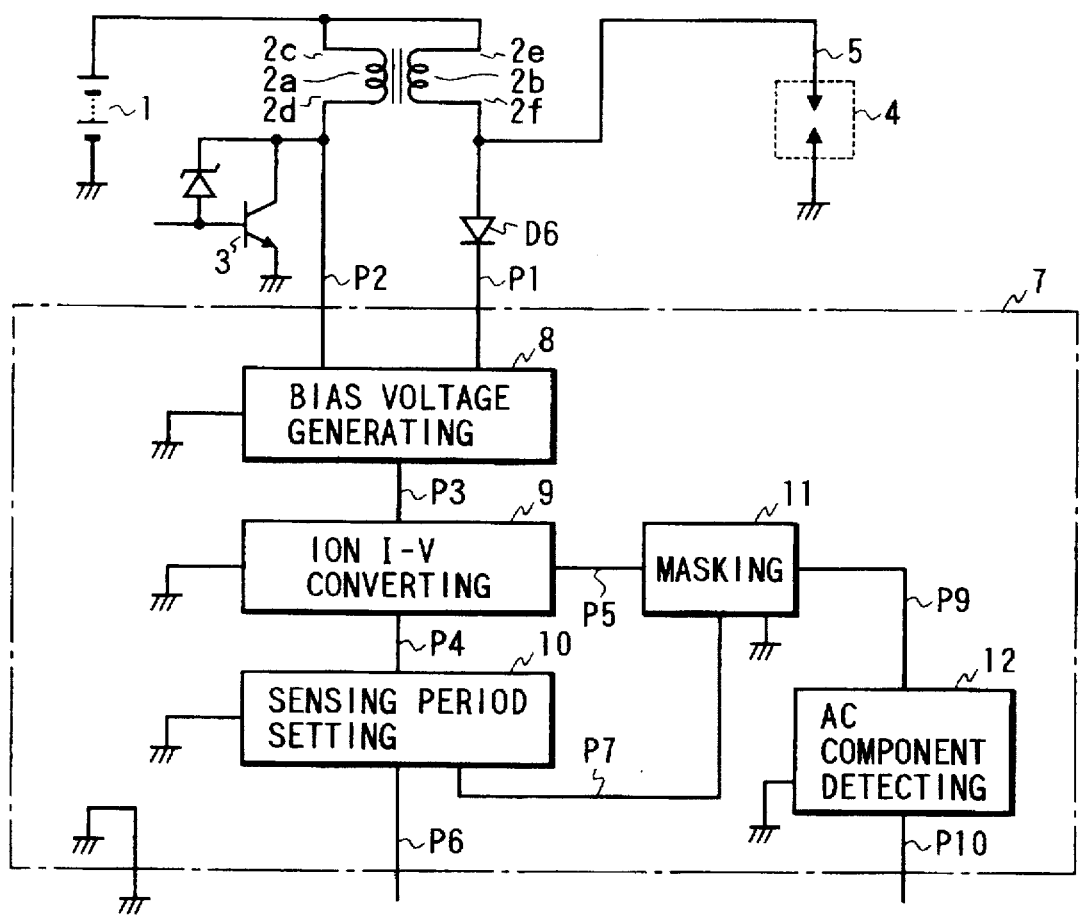
FIG. 3 is a schematic block diagram of a combustion condition detecting circuit according to a first embodiment.

FIG. 3 is a schematic block diagram for indicating an apparatus for sensing a combustion condition of an internal combustion engine according to a first embodiment of the present invention. In this drawing, reference numeral 1 shows a battery, reference numeral 2a indicates a primary winding of an ignition coil, reference numerals 2b represents a secondary winding of the ignition coil, and reference numeral 3 denotes a transistor for switching a coil primary current. The transistor 3 supplies and interrupts a current having several amperes to the primary winding 2a of the ignition coil. A constant voltage diode for limiting a collector voltage is employed with the transistor 3, and limits a voltage increase at a point "2d", which is caused by a back electromotive force produced when the coil primary current is interrupted (generally speaking, approximately 300 volts). The constant voltage diode is connected to the collector of the transistor 3. This collector of the transistor 3 is connected to a terminal "P2" of a combustion condition detecting circuit 7.

A high voltage side 2f of the secondary winding 2b is connected to an ignition plug 5 and a cathode of a high voltage diode D6. The ignition plug 5 serves the conventional function of igniting a gas mixture present in a cylinder 4, and also a function as an electrode for detecting an ion current which (will be described later).

The combustion condition detecting circuit 7 includes a bias voltage generating circuit 8, an ion current-to-voltage converting circuit 9, a sensing period setting circuit 10, a mask circuit 11, and an AC component detecting circuit 12. The bias voltage generating circuit 8 is connected with the collector of the transistor 3 by P2, with an anode of the high voltage diode D6 by P1, and with the ion current-to-voltage converting circuit 9 by P3. The ion current-to-voltage converting circuit 9 is connected with the sensing period setting circuit 10 by P4, with the mask circuit 11 by P5, and this mask circuit 11 is connected with the sensing period setting circuit 10 by P7. Also, the mask circuit 11 is connected with the AC component detecting circuit 12 by P9. The sensing period setting circuit 10 and the AC component detecting circuit 12 output signals therefrom via P6 and P10, respectively.

It should be noted that in this combustion condition detecting circuit according to the first embodiment, the polarities of the ignition coils are coincident with each other by the arrangement of the combustion condition detecting circuit in such a manner that the voltage during the ignition appearing at the ignition plug 5 has a positive polarity, and the withstanding reverse voltage of the high voltage diode D6 is more than several thousands of with respect to the high voltage of the ignition plug generated during the ignition.

Figure 4:
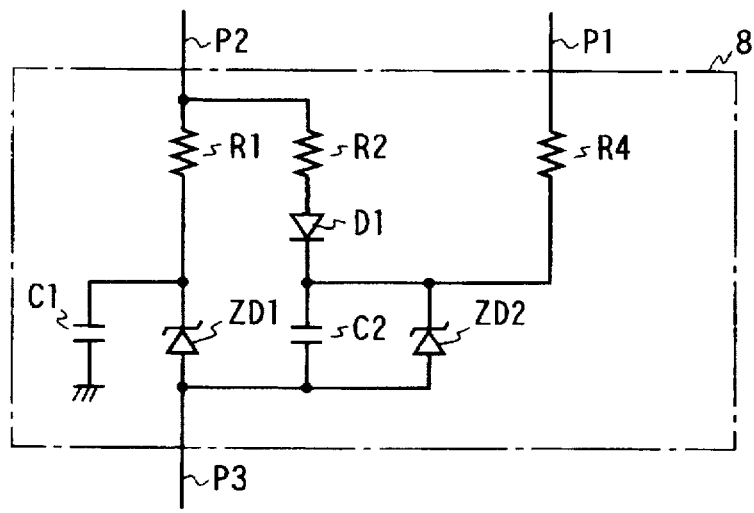
FIG. 4 is a circuit diagram for showing a bias voltage generating circuit of the first embodiment.

FIG. 4 illustrates the internal arrangement of the above-explained bias voltage generating circuit 8 shown in FIG. 3. In FIG. 4, a resistor R1 and a resistor R2 are connected to the P2, whereas anodes of zener diodes ZD1, ZD2 and a capacitor C2 are connected to the P3. Further, a resistor R4 is connected to the P1.

The other end of the above-described resistor R1 is connected to one end of a capacitor C1 together with the cathode of the zener diode ZD1, and the other end of this capacitor C1 is grounded. An anode of a diode D1 is connected to the other end of the resistor R2, and a cathode thereof is connected to the other end of the capacitor C2, and also the cathode of the zener diode ZD2 and the other end of the resistor R4.

The bias voltage generating circuit 8 with the above-described arrangement charges the capacitor C2 by using a high voltage (approximately 300V) produced at the P2 when the energizing operation of the primary winding 2a by the transistor 3 is interrupted. Then, a voltage having a positive polarity is applied to the ignition plug 5 via a circuit path from P1 via the high voltage diode D6 to the ignition plug 6 by using the electric charges stored in the capacitor C2 during the charging operation. It should be noted that the holding voltage of the capacitor C2 is defined by the zener voltage appearing at the zener diode ZD2 connected parallel to this capacitor C2. A similar effect may be achieved even when other electric circuit means such as a voltage limiting circuit is employed instead of this zener diode ZD2. Since the high voltage is held as the P2 voltage during such a period where the back electromotive force occurs but the P2 voltage is equal to the battery voltage during other period, a diode D1 is employed so as to prevent the capacitor C2 from being discharged. The diode D1 must have a sufficiently high reverse voltage withstanding characteristic with respect to the voltage held by the capacitor C2. The resistor R2 is employed so as to limit the changing current when the high voltage is produced at the P2 and the capacitor C2 is changed.

The circuit constructed of the resistor R1, the capacitor C1 and the zener diode ZD1 is a circuit for canceling the noise current caused by the voltage fluctuation of the ignition plug when the ignition operation is carried out at the secondary winding side of the ignition coil. Since a voltage having about 10V or more is produced at the primary winding side by the voltage at the secondary winding side during the ignition operation, when the zener voltage of the zener diode ZD1 is set to 10V or more, a current may flow through the resistor R1 and the zener diode ZD1 to the P3. Since the ion current corresponds to such a current flowing from the P3 to the P1, it may be canceled by supplying a current higher than the noise current flowing along the same direction from the P2 side in the above-described manner. It should be noted that the capacitor C1 constitutes a high frequency component cut filter in conjunction with the resistor R1 to reduce the noise component contained in the P2 voltage.

Figure 5:
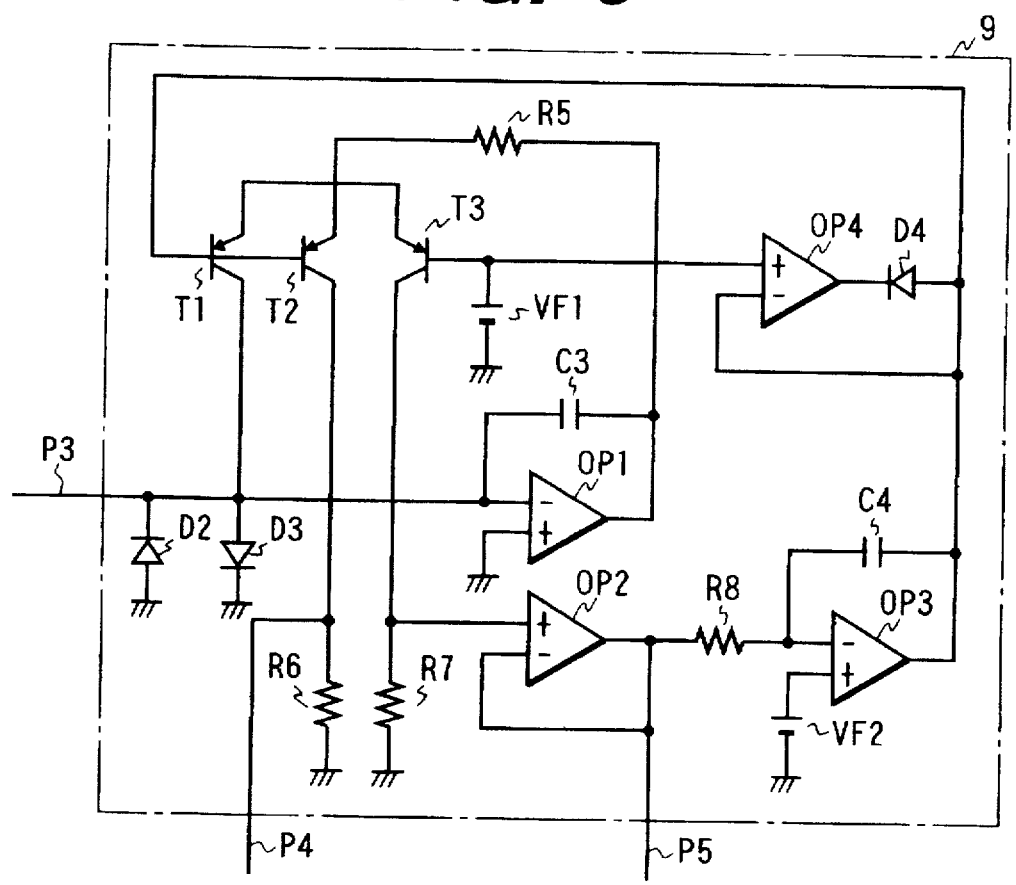
FIG. 5 is a circuit diagram for indicating an ion current-to-voltage converting circuit according to the first embodiment.

Next, FIG. 5 illustrates the internal arrangement of the ion current-to-voltage converting circuit 9 shown in FIG. 3. In FIG. 5, to the P3, a cathode of a diode D2, an anode of a diode D3, a collector of a PNP transistor T1, a capacitor C3, and an invert input of an operational amplifier OP1 are connected. A non-inverted input of this operational amplifier OP1 is connected to the ground. To the P4, a resistor R6 and a collector of a PNP transistor T2 are connected. An output of an amplifier OP2 and a resistor R8 are connected to the P5. Anodes and cathodes of diodes D2 and D3 are connected to the ground, respectively. The output of the operational amplifier OP1 is connected to the capacitor C3 and the resistor R5, and the resistor R5 is connected to the emitters of the PNP transistors T1, T2, T3. Furthermore, both of the bases of the transistors T1 and T2 are connected to the output of the operational amplifier OP3, the capacitor C4, the diode D4, and the inverted input of the operational amplifier OP4. Then, the base of the transistor T3 is connected to a constant voltage power supply VF1 and the non-inverted input of the operational amplifier OP4. The collector of the transistor T3 is connected to the resistor R7 and the non-inverted input of the operational amplifier OP2, and also the resistor R8 and the capacitor C4 are connected to the non-inverted input of the operational amplifier OP3.

The ion current-to-voltage converting circuit 9 converts the current flowing through the P3 into the corresponding voltage. In the ion current-to-voltage converting circuit 9, the diodes D2 and D3 constitute a circuit path for the excessive current flowing into/from the P3, and are not operated when the ion current having the values within a proper current value range flows. The transistors T1, T2 and T3 constitute a circuit for separating the ion current flowing from the P3. The transistor T1 corresponds to a circuit element for producing a reference current of the ion current separating (discriminating) circuit. This transistor T1 is used as the reference to produce a signal by the ion current from the transistors T2 and T3. In this first embodiment, there are two output series of the transistors T2 and T3. A further signal caused by a large number of ion currents may be derived by additionally connecting a similar element to these transistors. It should be understood that in such a range where the output from the operational amplifier OP1 is not saturated, the ion current flowing from the P3 becomes equal to the collector current of the transistor T1 due to the negative feedback operation of the operational amplifier. In this case, the collector current of the transistor T2 whose emitter and collector are common to those of the transistor T1 is proportional to the collector current of the transistor T1. A ratio of these collector currents is determined based upon the chip size ratio between the transistors T1 and T2, so that when the chip size of the transistor T1 is equal to that of the transistor T2, the same current as the current flowing from the P3 can be obtained from the collector of the transistor T2. Then, a voltage is produced from the resistor R6, which is defined by this current and the resistance value. As described above, the current flowing through the collector of the transistor T3 is determined based upon a difference voltage between the base voltages of the transistors T1 and T3, while using the current of the transistor T1 as the reference. Assuming now that the chip size ratio of the transistors T1 and T3 is selected to be 1:n, the respective collector currents are $I_{C1}$, $I_{C2}$, and also an error caused by the base currents is negligible, the following relationship is obtained in accordance with the Shockley equation:

$$V_T \ln(I_{c1}/I_s) - V_T \ln(I_{cs}/(n \cdot I_s)) = \Delta V$$

$$\therefore \Delta V = V_T \ln(n \cdot I_{c1}/I_{cs})$$

Figure 18:
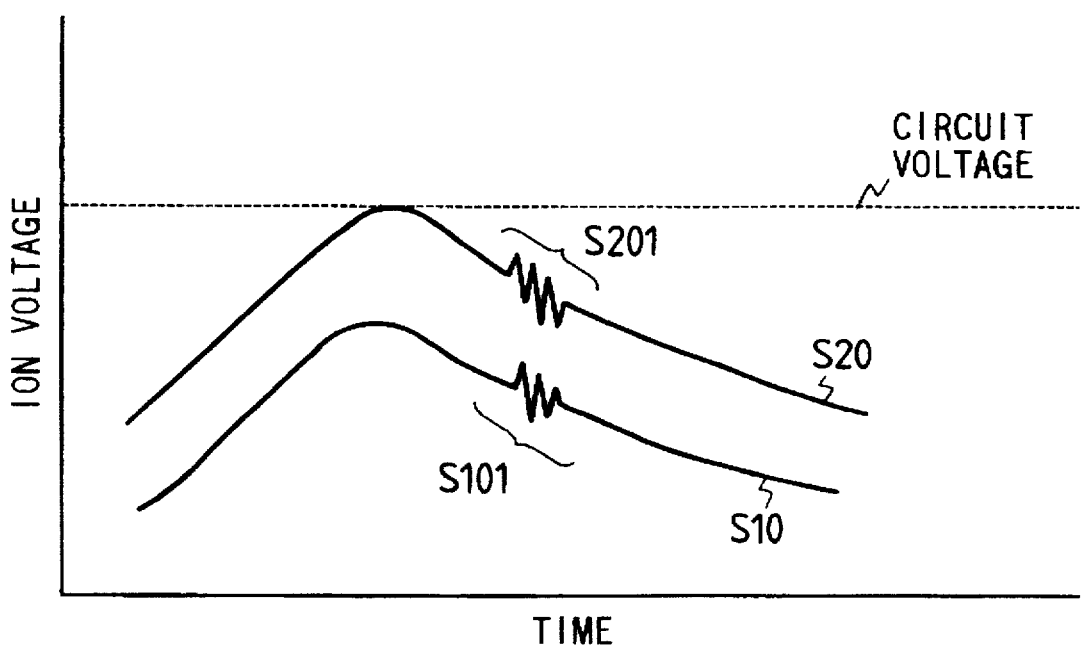
FIG. 18 is a waveform chart for showing output signals of ion current-to-voltage converting circuit according to the present invention.

As apparent from the above-described equation, if ΔV is constant, then the ratio of $I_{c_1}$ to $I_{c_3}$ becomes constant, since $V_T$ and "n" are constant. In accordance with the ion current-to-voltage converting circuit 9 of the present invention, the collector current of the transistor T3 is detected based upon the voltage drop of the resistor R7, and the base potential of the transistor T1 is changed in such a manner that this voltage becomes constant. When an integration circuit constructed of the operational amplifier OP3 is employed in this voltage control circuit to delay the response speed of the voltage control circuit of the resistor R7, namely to be set to respond to the low frequency component of the ion current, such a voltage signal can be eventually obtained from the resistor R7 in such a manner that the high frequency signal caused by the knocking is superimposed on the low frequency component signal within a substantially constant voltage range. It should be noted that the operational amplifier OP2 is employed so as to lower the voltage impedance of this resistor R7. Generally speaking, since the knocking signal contains the signal with the frequency components from several KHz to several tens of KHz, the frequency region where the integration circuit performs the integrating operation is set in order to obtain the signal having such a frequency range. As indicated in FIG. 18, it is possible to detect an ion current-to-voltage conversion waveform S10 during low revolution of the engine, and also another ion current-to-voltage conversion waveform S20 during high revolution of the engine, which have proper magnitudes. It should be noted that the above-described gain control should be carried out in such a way that a change in the low frequency components of the ion current-to-voltage conversion waveform is reduced (namely, is approached to a constant value), whereas changes in the high frequency components S101, S201, produced by the knocking phenomenon are not reduced but the changes are selected to be values corresponding to the actually occurred knocking phenomenon irrelevant to the high or low engine revolution. Although this embodiment can respond to such a wide engine revolution range from the high revolution by performing the gain control, the present invention is not limited thereto. For instance, when the combustion condition only in the high revolution range where the knocking phenomenon may easily occur is sensed, the controlled gain may be set to the fixed value only in the high revolution range.

Then, the circuit arranged by the operational amplifier OP4 and the diode D4 corresponds to a voltage clamping circuit which limits a base voltage difference between the transistors T1 and T3 to a constant range. This clamping circuit may be omitted, depending on the usage of the circuit. Another circuit other than the voltage clamping circuit may be employed by which the output voltage of the operational amplifier OP3 is not increased higher than a constant range with respect to the base voltage of the transistor T3. The constant voltage power supplies VF1 and VF2 employed in the circuit are realized by the constant voltage sources for the sake of convenience, and are alternatively realized by a circuit having a relative high impedance such as a resistor voltage dividing circuit.

Figure 6:
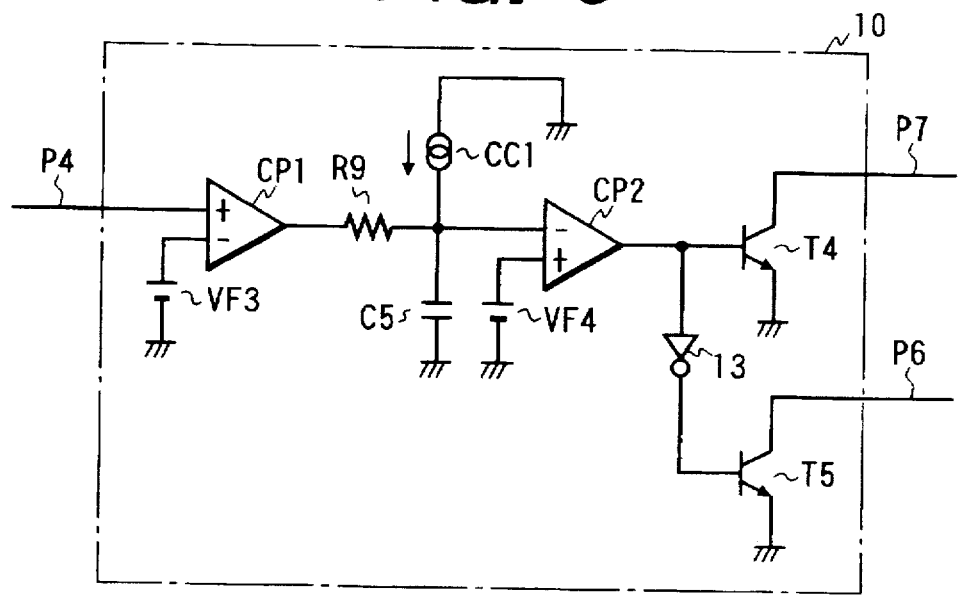
FIG. 6 is a circuit diagram for representing a sensing period setting circuit according to the first embodiment.

Subsequently, FIG. 6 indicates a concrete internal arrangement of the sensing period setting circuit 10. In FIG. 6, a non-inverted input of a comparator CP1 is connected to P4, and an invert input thereof is connected to a constant voltage source VF3, and also an output thereof is connected via a resistor R9 to a comparator C5, a constant current source CC1, and a comparator CP2. Other ends the constant current source CC1 and the capacitor C5 are connected to the ground, respectively. A non-inverted input of the comparator CP2 is connected to a constant voltage source VF4, and an output thereof is connected to a base of an NPN transistor T4 and an inverter circuit 13. The output of the inverter circuit 13 is connected to a base of an NPN transistor T5, emitters of the transistors T4 and T5 are connected to the ground, respectively, and also collectors thereof are connected to the P7 and P6, respectively. The low potential sides of the constant voltage sources VF3 and VF4 are connected to the ground.

In the sensing period setting circuit 10, the voltage signal converted by the ion current-to-voltage converting circuit 9 is compared with a preselected level. When the voltage signal exceeds this level, the sensing period setting circuit 10 judges that the gas mixture within the cylinder is normally fired (not misfire), and outputs a fire signal via the P6 to the external circuit, and also outputs a release signal to allow the detection of the knocking signal to P7 as the sensing period for the combusting condition while the voltage signal exceeds the predetermined level. Here, the signal detecting circuit by the comparator CP1 constitutes a filter means for delaying/quickening the ion current detection based on a time difference between the charging/discharging operations of the capacitor C5, which is determined by the constant current source CC1 and the resistor R9. This filter means may prevent the sensing period from being erroneously set, which is caused by erroneously detecting a noise signal having a short pulsatory shape, produced when the primary current of the ignition coil is supplied or interrupted. Such a noise cutting filter means may be conceived other than the above-described filter means. As to setting of the sensing period, various modifications may be conceived, for instance, after the voltage signal exceeds a preselected level, a predetermined period may be set. In this embodiment, the firing signal is an open collector output with employment of the NPN transistor, and the firing signal having a "low" level is outputted during the firing operation by externally pulling up the voltage signal by a resistor or the like. It should also be noted that the constant voltage sources VF3 and VF4 are indicated by constant voltage sources, for the sake of convenience, and may be realized by employing a circuit having a relatively high impedance such as a resistor voltage dividing circuit.

Figure 7:
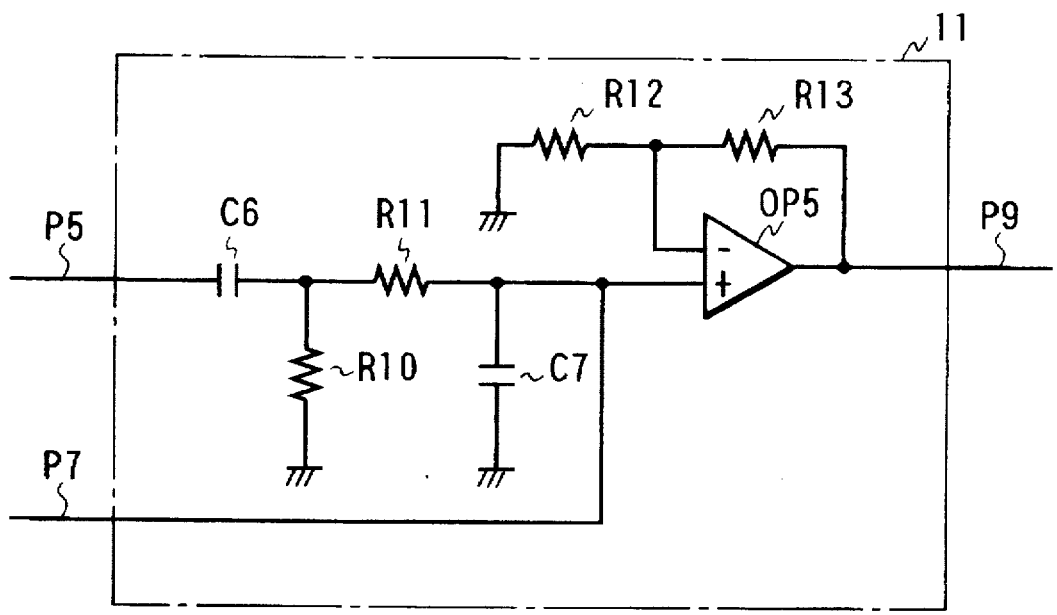
FIG. 7 is a circuit diagram for showing a mask circuit according to the first embodiment.

FIG. 7 indicates a concrete internal arrangement of the mask circuit 11. In FIG. 7, P5 is connected to a capacitor C6, the capacitor C6 is connected to a resistor R10 and a resistor R11, and the resistor R11 is connected to a capacitor C7, P7, and a non-inverted input of an operational amplifier OP5. An inverted input of the operational amplifier OP5 is connected to a resistor R12 and a resistor R13, the resistor R13 is connected to an output of the operational amplifier OP5 and the P9, and other ends of the resistor R12 and the capacitor C7 are connected to the ground. In the mask circuit 11, signal at the P5 detected by the ion current-to-voltage converting circuit 9 is amplified and the amplified signal is processed in a filter circuit provided at the post stage in order to having a sufficiently large amplitude. Also, this mask circuit 11 has an aim to mask-control the signal at the P5 in response to output signal from the sensing period setting circuit 10. In other words, originally, the erroneous detection can be avoided due to the superimposed noise produced when the primary current is supplied and interrupted by sensing the combusting condition during only a preselected period after combustion where the knocking phenomenon occurs. The reason why the filter means employed in the above-described sensing period setting circuit is not used to prevent such an erroneous detection is such that the error in detecting the ion current by the filter means is reduced and the actual ion current can be continuously detected.

The capacitor C6, the resistor R10, and the resistor R11 and also the capacitor C7 constitute a low frequency signal cut filter and a high frequency signal cut filter, which are arranged by only passive elements. This filter circuit may interrupt (will be referred to "masking operation" hereinafter) the detection of the knocking signal via the P7, and may also remove such a signal having a high frequency component which could not be removed by the circuit response characteristic. The amplifier circuit by the operational amplifier OP5 is constructed by employing the general non-inverting amplifier circuit. The masking operation is controlled in response to the output from the above-described sensing period detecting circuit. According to this embodiment, when it is judged by the sensing period setting circuit that a predetermined amount of ion current is detected, this masking operation is released.

Figure 8:
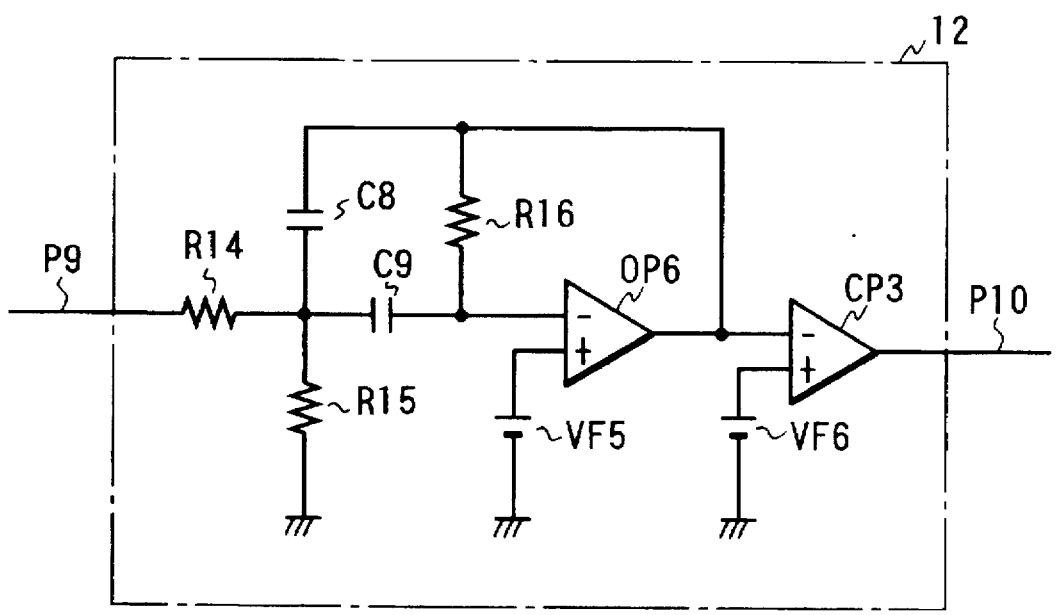
FIG. 8 is a circuit diagram for indicating an AC component detecting circuit according to the first embodiment.

FIG. 8 is a circuit diagram for showing the AC component detecting circuit 12. In FIG. 8, the P9 is connected to a resistor R14, the resistor R14 is connected to a resistor R15 and capacitors C8, C9, and the other end of the resistor R15 is connected to ground. An inverted input of an operational amplifier OP6 is connected to the capacitor C9 and a resistor R16, an output thereof is connected to the resistor R16, a capacitor C8 and the inverted input of the comparator CP3, and a non-inverted input thereof is connected to a constant voltage source VF5.

The AC component detecting circuit 12 has a purpose to derive only the knocking signal contained in the high frequency signal amplified by the amplifier circuit provided at the pre-stage, and also to process this knocking signal, thereby externally outputting the processed knocking signal. In this embodiment, the active bandpass filter circuit with employment of the operational amplifier has been employed as the filter circuit. The comparator CP3 performs the waveform shaping operation for the signal containing only the knocking signal by way of the filter. As the method for outputting the knocking signal, various methods may be conceived, for instance, a method for waveform-shaping the knocking signal to be outputted, a method for integrating the knocking signal to output the interface of a computer for controlling the knocking operation. Both of the signal transmitting method and the signal processing method have been employed as one possibility of the present invention for the signals in the knocking signal detecting circuit and the control apparatus with using the knocking signal. However, the present invention is not limited to these methods. The constant voltage source circuits VF5 and VF6 employ the power supply circuits, for the sake of convenience, and therefore may be realized by employing a circuit having a relatively high impedance such as a resistor voltage dividing circuit.

According to the above-described first embodiment of the present invention, the ion current detecting voltage is generated by receiving the signals from the primary and secondary coil windings of the ignition coil. Both of the knocking signal and the misfire detecting signal can be simultaneously obtained without receiving the error detection preventing signal from the engine control system. Moreover, these signals can be detected over the wide range of the engine revolution range in high precision, at low cost.

Second Embodiment

Figure 9:
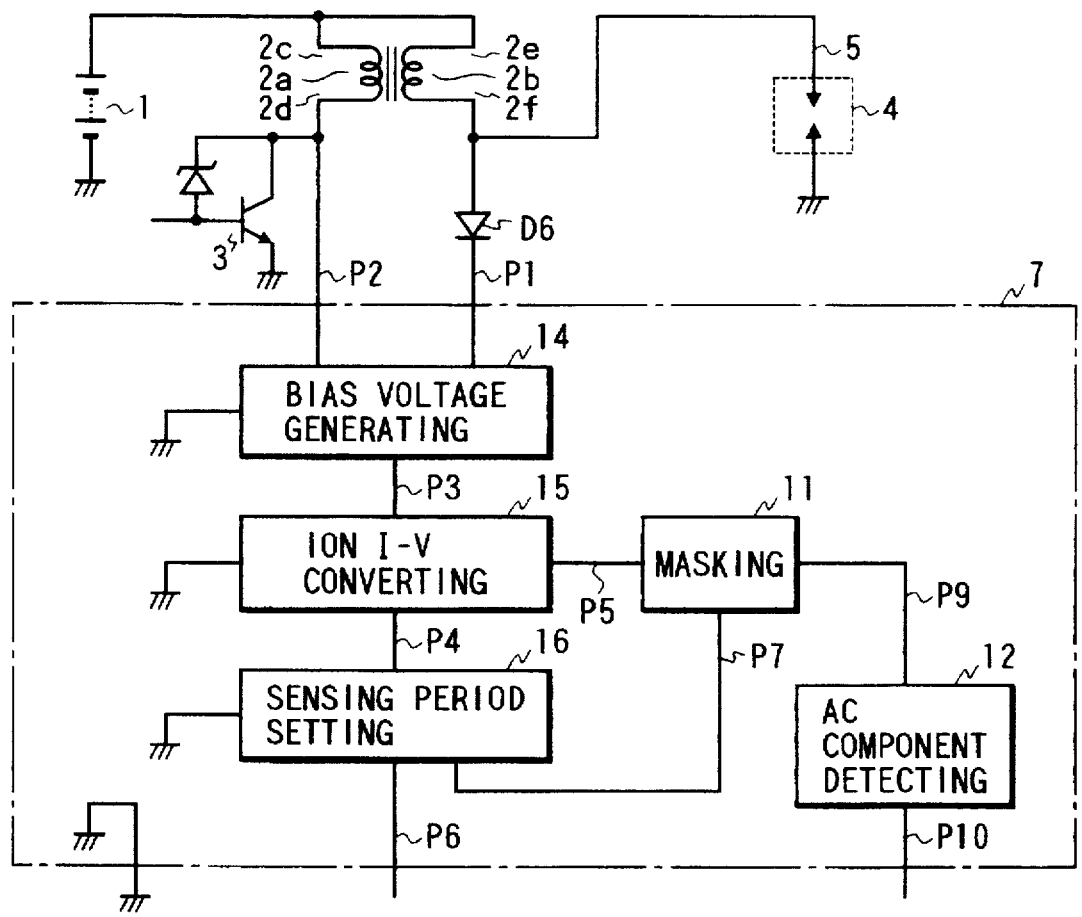
FIG. 9 is a schematic block diagram of a combustion condition detecting circuit according to a second embodiment.

FIG. 9 is a circuit diagram for showing a combustion condition detecting circuit according to another embodiment of the present invention. In the previous embodiment, the combustion condition detecting circuit has been arranged by setting the polarity of the ignition plug voltage to the positive polarity during ignition so as to apply the voltage having the positive polarity to the ignition plug 5, thereby detecting the ion current. However, generally speaking, since negative plug voltages are widely used during ignition, a certain measurement is required when the negative voltage ignition is utilized. According to this embodiment negative polarity ignition is utilized.

A basic circuit arrangement of this combustion condition detecting circuit shown in FIG. 9 is the same as that of FIG. 3. However, in the combusting condition detecting circuit of FIG. 9, the anode of the high voltage diode D6 is connected to 2f of the secondary windings 2b of the ignition coil and the ignition plug 5, and 2e of the secondary winding 2b is connected to the battery (namely, polarity of ignition coil is reverse to that of first embodiment). The cathode of the high voltage diode D6 is connected via P1 to a bias voltage generating circuit 14, and the P2 of the bias voltage generating circuit 14 is connected to 2d of the primary winding 2a and also the collector of the transistor 3. Furthermore, an ion current-to-voltage converting circuit 15 is connected to the bias voltage generating circuit 14 and P3, a mask circuit 11 is connected to P5, a sensing period setting circuit 16 is connected to P4, and both of this sensing period setting circuit 16 and the mask circuit 11 are connected to P7.

In this circuit, a voltage produced during ignition is a voltage having a negative polarity, and similarly, a bias voltage has a negative polarity when an ion current is detected. Here, an ion current flowing direction is such a direction along which the ion current flows from the ignition plug 5 via the high voltage diode D6 to the combustion condition detecting circuit 7.

Figure 10:
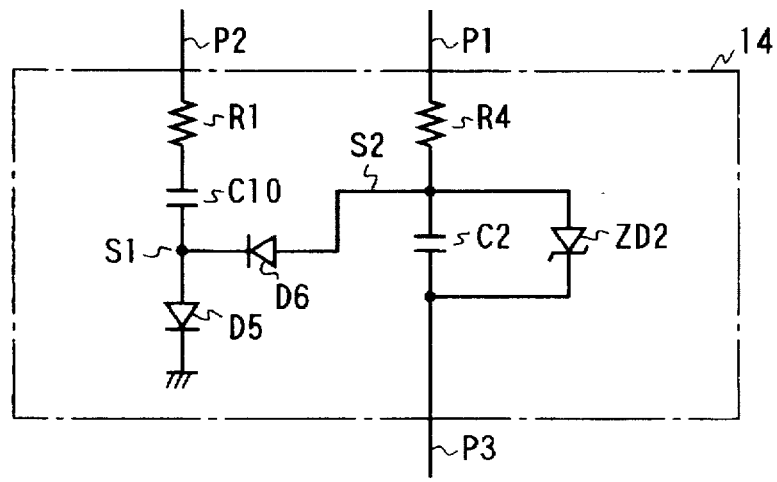
FIG. 10 is a circuit diagram for showing a bias voltage generating circuit of the second embodiment.

FIG. 10 is a circuit diagram for representing the bias voltage generating circuit 14 of this embodiment. In FIG. 10, P2 is connected to the resistor R1, the other end of the resistor R1 is connected to a capacitor C10, and the other end of the capacitor C10 is connected to the anode of the diode D5 and also the cathode of the diode D6. The cathode of the diode D5 is connected to ground, the anode of the diode D6 is connected to the capacitor C2 and the resistor R4 and further the anode of the zener diode ZD2, the cathode of the zener diode ZD2 and the other end of the capacitor C2 are connected to P3, and the other end of the resistor R4 is connected to P1.

When the supply of the primary current of the ignition coil is interrupted by the transistor 3, the back electromotive force is generated in the coil, the current flows from the resistor R1 via the capacitor C10 and the diode D5 to the ground, and then the capacitor C10 is charged up to a voltage (approximately 300V) defined by the clamp voltage of the transistor 3. Since the back electromotive force of the coil is suddenly reduced, the potential at P2 is gradually equal to the battery voltage. When the potential at the high potential side of the capacitor C10 is lowered to the battery voltage, the potential at the low potential side (S1) thereof is lowered only the held voltage. Lowering of this potential at this S1 side causes the cathode potential of the diode D6 to be lowered, so that a current may flow from P3 via the capacitor C2 to the diode D6, and then the voltage across the capacitor C2 is charged to the zener voltage of the zener diode ZD2. As a result, electron charges having the polarity opposite to that of the previous embodiment are stored in the capacitor C2, and thus an ion current detecting bias voltage source having the negative polarity is obtained.

Figure 11:
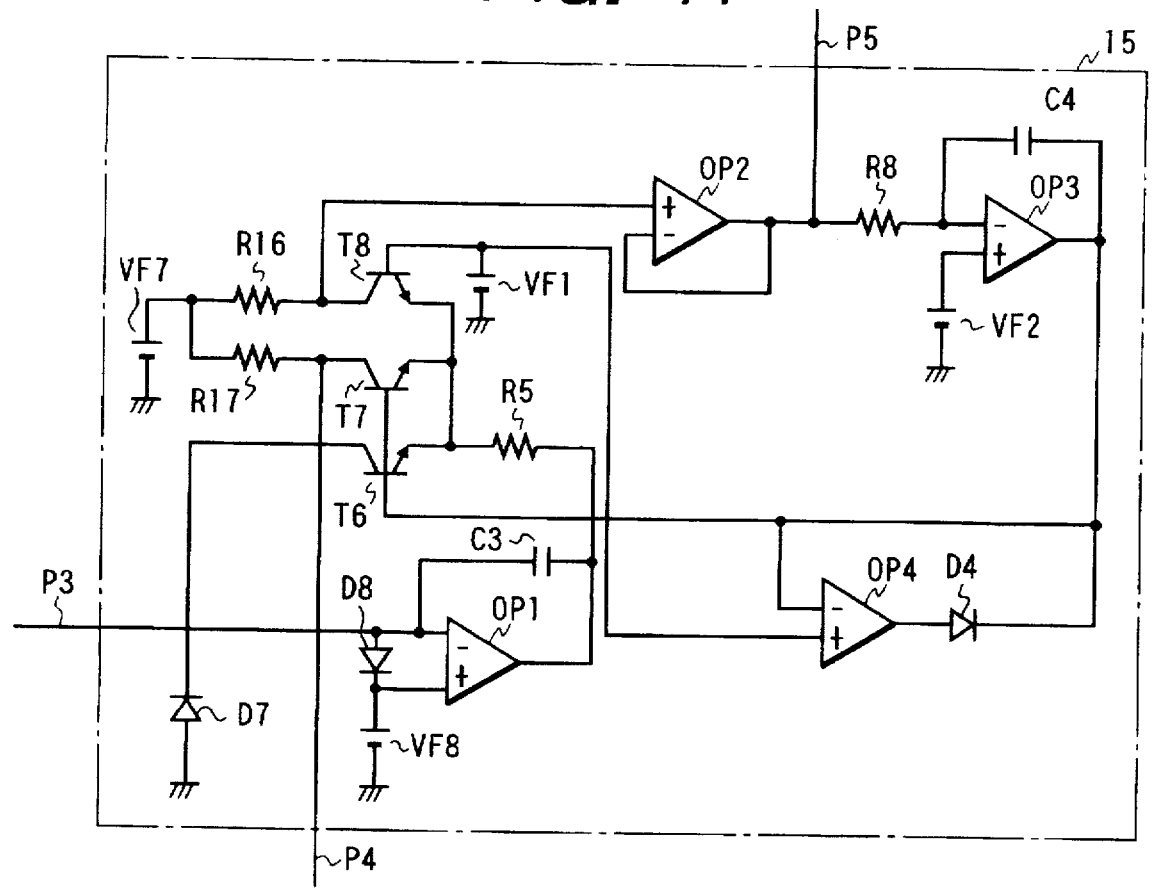
FIG. 11 is a circuit diagram for indicating an ion current-to-voltage converting circuit according to the second embodiment.

FIG. 11 is a circuit diagram for showing the ion current-to-voltage converting circuit of this embodiment. In FIG. 11, P3 is connected to a cathode of a diode D7 and an anode of a diode D8, and further the inverted input of the operational amplifier OP1 and a collector of an NPN transistor T6. P4 is connected to a collector of an NPN transistor T7 and a resistor 17, and P5 is connected to the output of the operational amplifier OP2 and a resistor R8. An anode of the diode D7 is connected to the ground, and a cathode of the diode D8 is connected to a constant voltage source VF8 and a non-inverted input of the operational amplifier OP1. The output of the operational amplifier OP1 is connected to the capacitor C3 and the resistor R5, and this resistor R5 is connected to the emitters of the NPN transistors T6, T7 and T8. The collector of the transistor T8 is connected to the resistor R16 and the non-inverted input of the operational amplifier OP2. Resistors R16 and R17 are connected to a constant voltage source VF7, the base of the transistor T8 is connected to the constant voltage source VF1 and the non-inverted input of the operational amplifier OP4, and the inverted input of the operational amplifier OP3 is connected to the resistor R8 and the capacitor C4. The inverted input of the operational amplifier OP4 is connected to the cathode of the diode D4, the output of the operational amplifier OP3, and the capacitor C4. The anode of the diode D4 is connected to the output of the operational amplifier OP4.

A basic operation of this ion current-to-voltage converting circuit 15 has been described in connection with the above-described embodiment. Although the circuit of this ion current-to-voltage converting circuit 15 is the same as that of FIG. 5, since the ion current flowing direction is directed from the terminal P3 into the ion current-to-voltage converting circuit, the conventional ion current separating transistor arranged by the PNP transistor is replaced by the NPN transistor.

Figure 12:
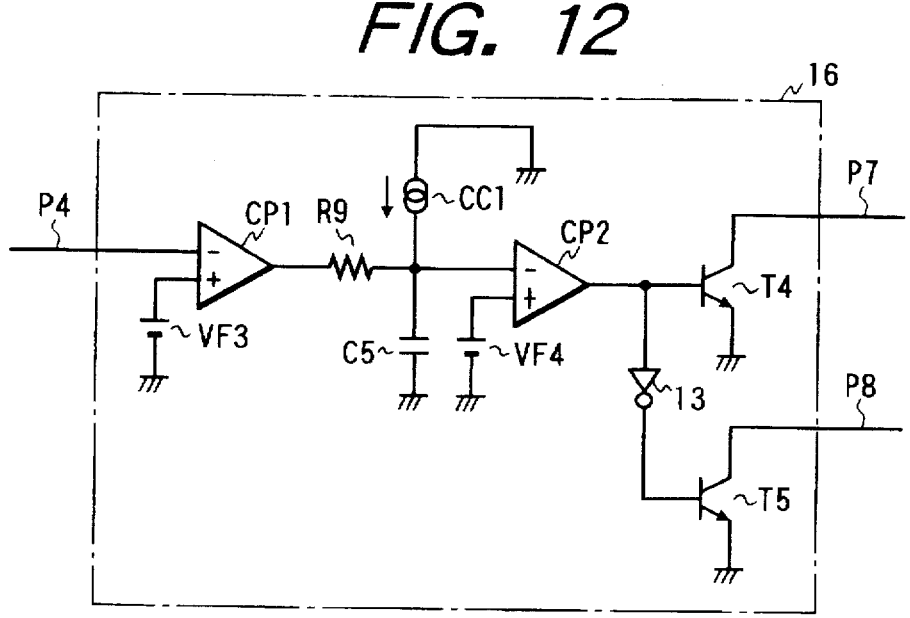
FIG. 12 is a circuit diagram for representing a sensing period setting circuit according to the second embodiment.

In FIG. 12, there is shown a circuit diagram of the sensing period setting circuit 16 according to this embodiment. Contrary to the sensing period determining circuit of the first embodiment shown in FIG. 6, the connection between the inverted input of the comparator CP1 and the non-invert input thereof is reversed in FIG. 12.

In the sensing period setting circuit, as described above, the input phase of the comparator CP1 is reversed so as to cancel the reversed phase of the voltage converted output derived from the ion current-to-voltage converting circuit, so that a similar circuit operation to that of the above-described embodiment can be obtained.

As previously explained, according to this embodiment, the discharge voltage polarity during ignition can be set to the negative voltage, and also the ion current detecting bias voltage can also be set to the negative polarity without changing a total number of constructive elements and also the basic circuit operation. In general, since a discharge voltage polarity during ignition is varied to perform the negative polarity discharge, it is known that an absolute value of a discharge voltage during discharge operation is increased. The ignition operation with high energy can be performed. However, it is also known that an ion current itself under negative polarity biasing condition would become low, as compared with that under positive polarity biasing condition.

Third Embodiment

Figure 13:
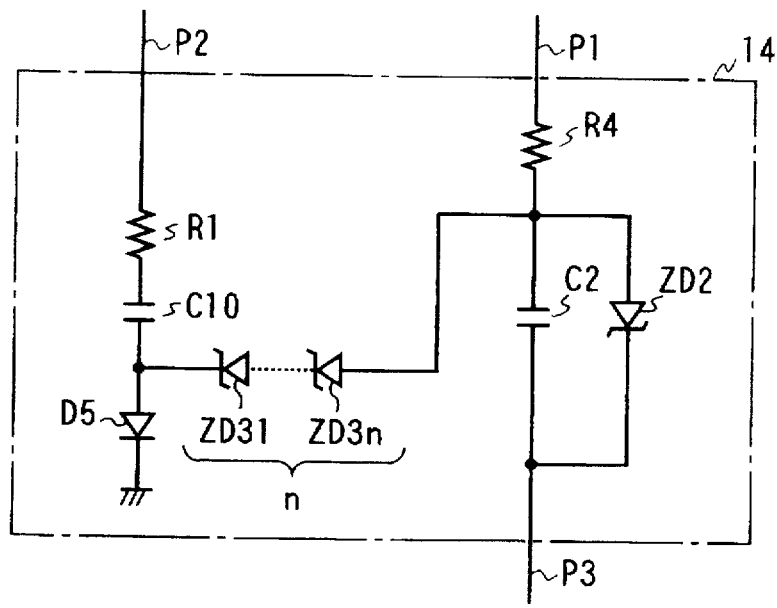
FIG. 13 is a circuit diagram for showing a bias voltage generating circuit according to a third embodiment.

FIG. 13 is a circuit diagram for representing a bias voltage generating circuit according to a further embodiment of the present invention. In FIG. 13, zener diodes ZD31 to ZD3n are replaced by the diode D6 employed in the bias voltage generating circuit according to the above-described embodiment. Even when the diode D6 is replaced by these zener diodes ZD31 to ZD3n, when a voltage of n×Vz (where zener voltage is Vz[V]) is sufficiently higher than the zener voltage of the zener diode ZD2 for defining the holding voltage of the capacitor C2, voltage drops along the forward direction produced in the diode D6 and the zener diodes ZD31 to ZD3n, which are generated during charging operation of the capacitor C2 are merely different from those of the previous embodiment. When the value of "n" is selected to be 10 or more, the forward voltage drop is negligible with respect to the holding voltage of the capacitor C2.

As explained before, since the diode D6 is substituted by the zener diodes ZD31 to ZD3n, the active circuit elements for constituting the bias voltage generating circuit of the diode D5, the zener diodes ZD31 to ZD3n, and the zener diode ZD2 may be constructed on a monolithic integrated circuit. Accordingly, this bias voltage generating circuit can be made compact and low in cost, as compared with the conventional method for separately providing the active elements.

Since the terminal voltages, namely the anode and cathode potentials of the diode D6 are lowered to the negative potentials as a diode element which can be realized on a bipolar monolithic integrated circuit, only an emitter-base junction of an NPN transistor is applied. In general, since a reverse withstanding voltage of this emitter-base junction is low, e.g. several volts, this diode D6 cannot be replaced by only one element. Therefore, as indicated in FIG. 13, a plurality of these elements are series-connected to each other, so that a sufficiently high withstanding voltage can be obtained.

Fourth Embodiment

Figure 14:
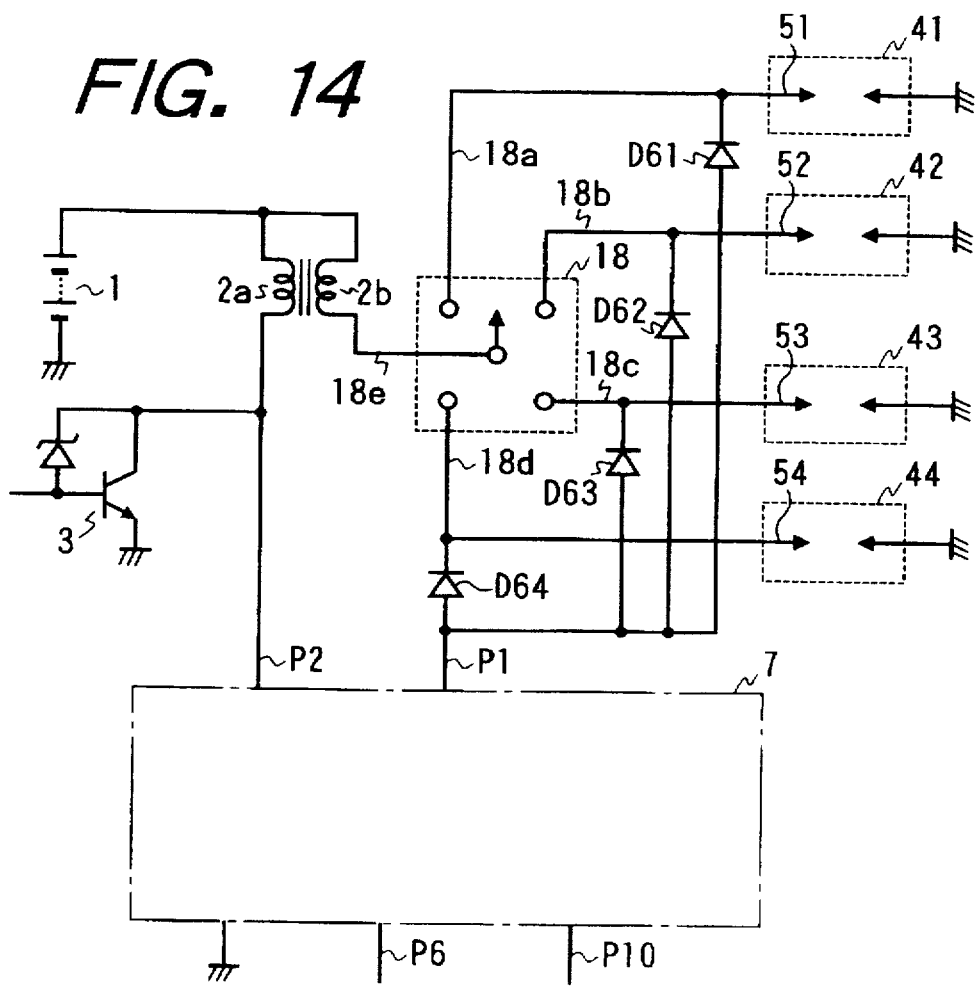
FIG. 14 is a schematic diagram for indicating a combusting condition detecting circuit connecting method according to a fourth embodiment.

FIG. 14, illustrates the combustion condition detecting circuit, according to a still further embodiment of the present invention. In FIG. 14, reference numerals 41 to 44 indicate each cylinder of a multi-cylinder type engine, reference numerals 51 to 54 denote ignition plugs of the respective cylinders, and symbols D61 to D64 show high voltage diodes. Also, reference numeral 18 indicates a distributor. The respective terminals 18a to 18d of the distributor 18 are connected to the ignition plugs of the respective cylinders, and a terminal 18e thereof is connected to the secondary winding of the ignition coil.

The circuit diagram of FIG. 14 indicates the connection method (system) for the combustion condition detecting circuit 7 shown in FIG. 3. In particular, the connection system of FIG. 14, is related to a high voltage distributing system for mechanically distributing ignition energy to the respective cylinders of an internal combustion engine. That is, ignition voltages are applied to ignition plugs employed in the plural cylinders by employing a single ignition coil, a single transistor for switching a single coil current, and a distributor for distributing ignition voltages.

As the method for detecting the ion currents flowing through the respective cylinders of the multi-cylinder type engine, such a method may be conceived that a plurality of ion current detecting circuits are prepared whose number is equal to that of the cylinders. However, this method requires complex arrangements and higher cost. Therefore, according to this embodiment, such a method is shown which detects the ion currents flowing through the plural cylinders by employing a single ion current detecting apparatus.

In this embodiment, the voltage at the connection point 18e between the ignition coil and the distributor becomes a high voltage (several thousands of volts) with a positive polarity during ignition, and also a voltage (several tens to several hundreds of volts) with a positive polarity when the ion current is detected. The high voltage diodes D61 to D64 interrupt the supply of currents to the ion current detecting circuit caused by the high voltage produced during ignition in each of these cylinders, and at the same time, apply the ion current detecting voltage biases to all of these cylinders when the ion currents of the respective cylinders are detected. Actually, since the ion current is produced only for several milliseconds just after the ignition operation, the same effect may be achieved either when the ion currents of all of these connected cylinders are simultaneously detected, or if only the ion current in one cylinder is detected.

In this embodiment, the description is made of the method for measuring the ion currents byway of a single ion current detecting circuit, assuming that a four cylinder engine is employed. This connection method may be similarly applied to other types of engines with cylinders larger than 4 cylinders, while a total number of high voltage diodes is increased whose number is equal to that of the cylinders. It should be understood that since the ion currents are detected at the same time by this connection method, when the number of cylinders is increased, there are certain possibilities that the combustion periods are overlapped with the ion current producing periods during high revolution periods of the engine. In this case, a total number of ion current detecting circuits is increased and then the cylinder quantities simultaneously detected by a single ion current detecting circuit may be reduced. Considering the combustion period, ion current occurring period, and engine revolution speed, a single ion current detecting circuit may properly detect ion currents flowing through 4 cylinders, or less.

According to the embodiment, the combusting conditions of the plural cylinders can be sensed with a low-cost circuit arrangement.

Fifth Embodiment

Figure 15:
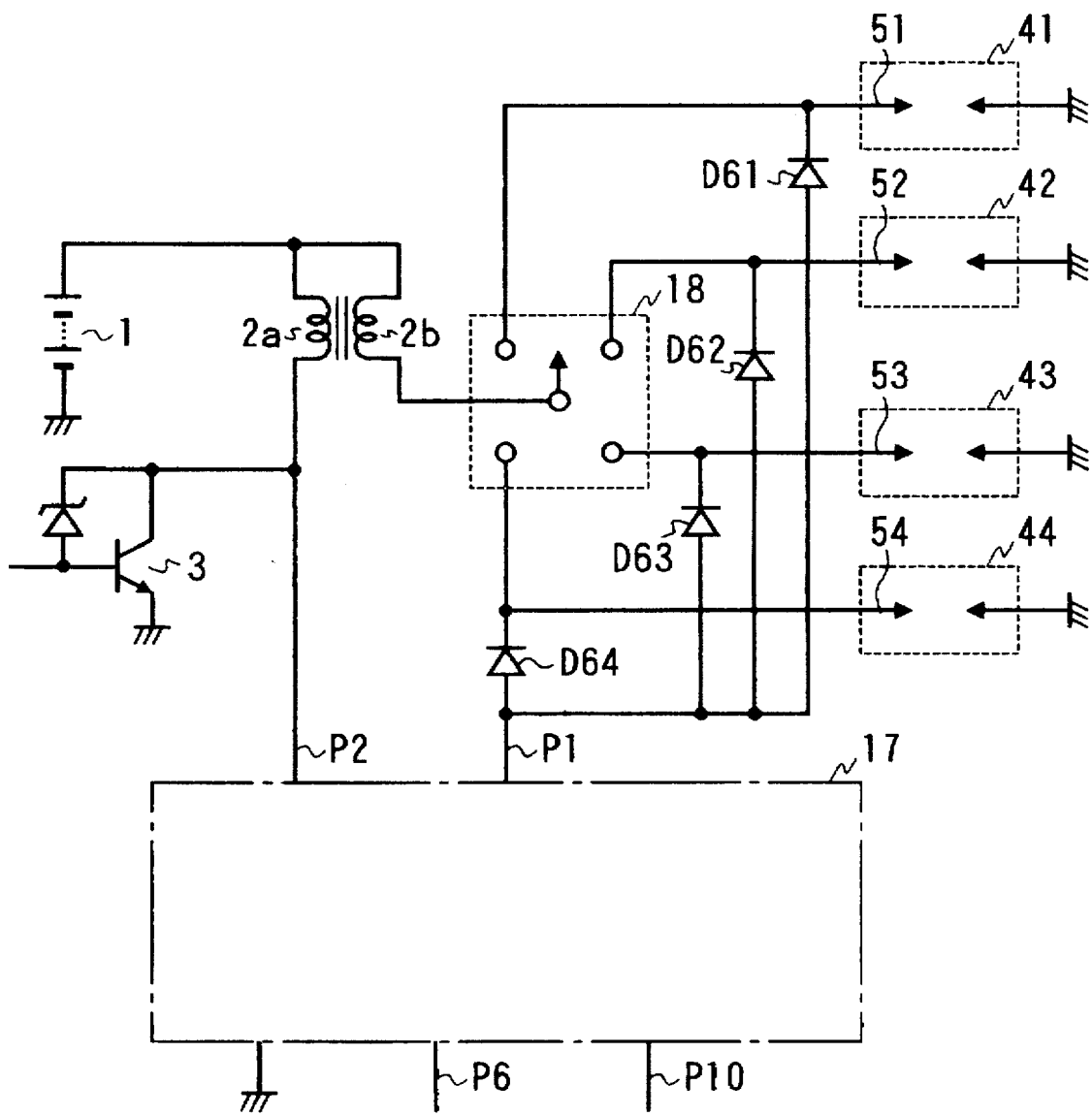
FIG. 15 is a schematic diagram for indicating a combusting condition detecting circuit connecting method according to a fifth embodiment.

FIG. 15 shows a combustion condition detecting circuit according to a further embodiment of the present invention. In FIG. 15, although the circuit elements 41 to 44, 51 to 54, D61 to D64 and 18 are similar to those of the preceding embodiment, the connection directions of the high voltage diodes D61 to D64 are opposite to those of this fifth embodiment. This combusting condition detecting circuit employs the sensing circuit of the second embodiment, and ignition coils having polarities opposite to those of the fourth embodiment with employment of the circuit of the first embodiment.

The circuit diagram of FIG. 15 corresponds to another ignition system to with the combustion condition detecting circuit of the second embodiment, shown in FIG. 9. The connection system of FIG. 15 is known as a "high voltage discharge system" employed in the ignition system of the internal combustion engine. Reference numeral 17 of FIG. 15 is a combustion condition detecting circuit corresponding to the combustion condition detecting circuit 7 of FIG. 9. A basic operation of this circuit is similar to that of the fourth embodiment. However, the polarity of the high voltage produced at the ignition plug during ignition is negative, and the voltage bias applied to the ion current detecting cylinder is performed under negative polarity voltage.

With employment of the circuit connection of this embodiment, in the ignition system such that the ignition voltage is high and the ignition operation is carried out by the voltage having the negative polarity at higher ignition efficiency, the ion currents flowing through the plural cylinders can be detected by a single ion current detecting circuit even in the multi-cylinder type engine.

Although the embodiment has been applied to the four cylinder type engine as one example, other modifications may be realized. For instance, in the case of a multi-cylinder type engine less than four cylinders, the number of the high voltage diodes are reduced. To the contrary, in the case of another multi-cylinder type engine greater than four cylinders, a plurality of ion current detecting circuits may be employed to detect the ion current similar to the method shown in the fourth embodiment.

Sixth Embodiment

Figure 16:
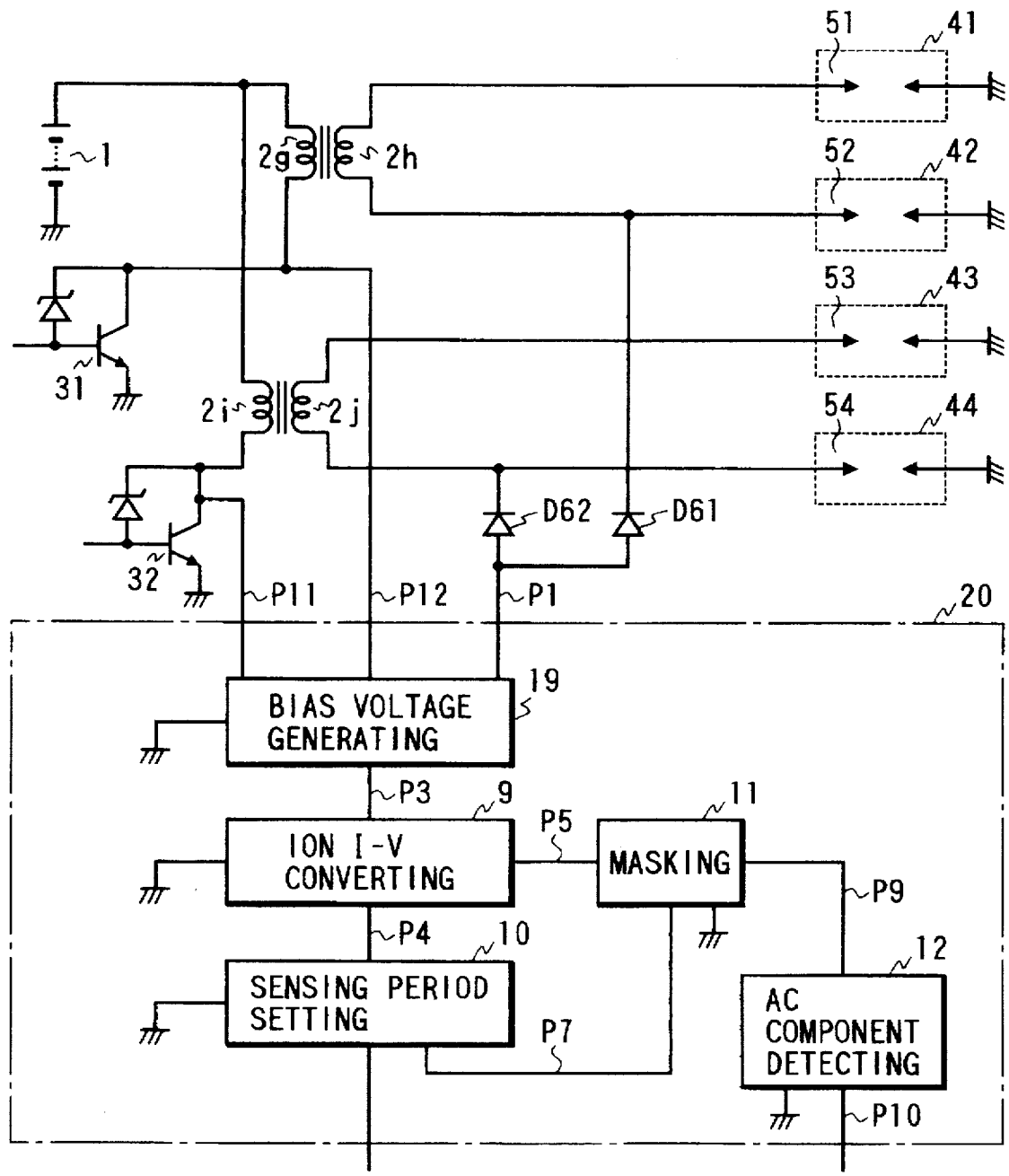
FIG. 16 is a schematic diagram for indicating a combusting condition detecting circuit connecting method according to a sixth embodiment.

FIG. 16 shows a combustion condition detecting circuit according to a sixth embodiment of the present invention. In FIG. 16, reference numerals 41 to 44 and 51 to 54 indicate cylinders of a multi-cylinder type engine and ignition plugs similar to those of the fourth embodiment. The cathodes of the high voltage diodes D61 and D62 are connected to the ignition plugs 52 and 54, whereas the anodes of the high voltage diodes D61 and D62 are connected via the terminal P1 to the combusting state sensing circuit 20. The secondary windings 2h and 2j of the ignition coil are connected to the ignition plugs 51, 52 and 53, 54. The primary windings 2g and 2i of this ignition coil are connected to the battery 1 by one ends thereof, and connected to coil current switching transistors 31 and 32 and also to the combusting condition detecting circuit 20 via a terminal P11.

The ignition system indicated in FIG. 16 is known as a "simultaneous ignition system". In this ignition system, a single ignition coil is allocated to both of a cylinder in a compression stage and another cylinder in an exhaust stage as the same cylinder group, and ignition coil voltages are applied to these cylinders at the same timing. At this time, in the cylinder under compression stage, a gasoline/air mixture is burned and explosion occurs, whereas a discharge is merely performed in the cylinder under exhaust stage. In the case of such a simultaneous ignition system, a distributor is no longer required, as compared with the high voltage distributing systems of the fourth and fifth embodiments. Also, a total number of ignition coils is reduced to a half of those of cylinders. It should be noted in such a simultaneous ignition system, that there are two different ignition plugs, namely one ignition plug to perform a positive polarity discharge, and another ignition plug to perform a negative polarity discharge.

In the circuit shown in FIG. 16, the ion current detecting paths are different from each other with respect to the ignition plugs. For instance, as to the ignition plug 52, the ion current is detected in the path defined from the terminal P1 of the combusting condition detecting circuit via the high voltage diode D61 to the ignition plug 52. As to the ignition plug 54, the ion current is detected in the path defined from the terminal P1 of the combusting condition detecting circuit 20 via the high voltage diode D2 to the ignition plug 54. Similarly, the ion current is detected in the path defined from the terminal P1 via the high voltage diode D61 and the ignition coil 2h to the ignition plug 51 as to the ignition plug 51. With respect to the ignition plug 53, the ion current is detected in the path defined from the terminal P1 via the high voltage diode D62 and the ignition coil 2j to the ignition plug 53. The ion current path of the ignition plug 52 is merely different from that of the ignition plug 54 via the ignition coil. When the ion current is detected via the ignition coil, the high frequency current component contained in the ion current is reduced by the choke effect because of such a characteristic that the inductance of the ignition coil is large. Actually, since the high frequency component passes through to some extent due to the coil interline capacitance, the knocking signal can be practically detected.

Figure 17:
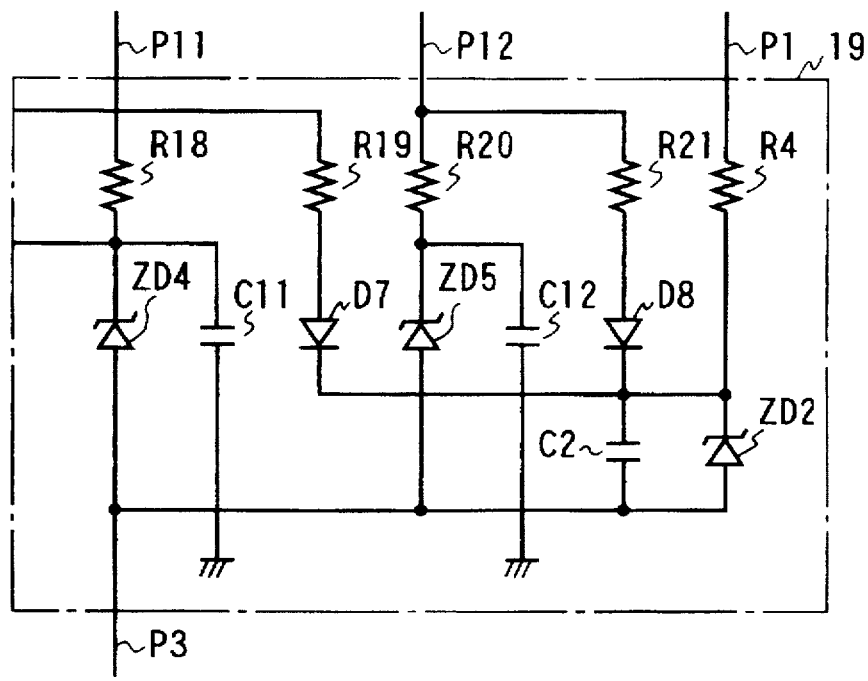
FIG. 17 is a circuit diagram for representing a bias voltage generating circuit according to the sixth embodiment.

FIG. 17 is a circuit diagram of a bias voltage generating circuit according to this embodiment of the present invention. In FIG. 17, a terminal P11 is connected to resistors R18 and R19, another terminal P12 is connected to resistors R20 and R21, another terminal P3 is connected to anodes of zener diodes ZD4, ZD5, ZD2, and the capacitor C2, and further another terminal P1 is connected to a resistor R4. A cathode of the zener diode ZD4 is connected to the resistor R18 and the capacitor C11, other ends, of the capacitors C11 and C12 are connected to the ground, and the cathode of the zener diode ZD is connected to the resistor R20 and the capacitor C12. Further, other ends of the resistors R19 and R20 are connected to the anodes of the diodes D7 and D8, and also the cathodes of the diodes D7 and D8 are connected to the capacitor C2, the cathode of the zener diode ZD2, and the resistor R4.

The circuit shown in FIG. 17 corresponds to a circuit for producing an ion current detecting bias voltage in the combustion condition detecting circuit 20 indicated in FIG. 16. The electric charges are supplied from the signal path of the terminals P11 and P12 to the primary winding of the ignition coil to charge the capacitor C2. Both the charging operation to this capacitor and the noise erroneous detection preventing operation are similar to those of the first embodiment.

As previously described in detail, in accordance with the combustion condition detecting apparatus for internal combustion engines, according to the present invention, the knocking phenomenon can be sensed from the ion current. Therefore, a combustion condition detecting apparatus with high precision can be obtained at low cost even with the knocking phenomenon sensing capability.

Also, according to the combustion condition detecting apparatus for internal combustion engine of the present invention, it is possible to obtain a combustion condition detecting apparatus capable of sensing the knocking phenomenon over the entire engine revolution range.

Further, according to the combustion condition detecting apparatus of the present invention, it is possible to obtain such an apparatus with a simple structure and low cost capable of sensing the knocking phenomenon even for multi-cylinder engines.

Moreover, according to the combustion condition detecting apparatus for internal combustion engine of the present invention, it is possible to obtain a combustion condition detecting apparatus equipped with both the knocking phenomenon detecting function and the misfire judging function without a complex structure.

What is claimed is:

1. A combusting combustion detecting apparatus for an internal combustion engine, comprising:

bias voltage generating means for applying a bias voltage to an ignition plug disposed in a cylinder of the internal combustion engine;

ion current-to-voltage converting means for converting an ion current produced in response to said bias voltage into a voltage corresponding to said ion current;

filter means for reducing a pulsatory signal upon reception of said voltage signal output from said ion current-to-voltage converting means;

sensing period setting means for defining a predetermined combusting condition sensing period based upon a filter signal output from said filter means; and AC component detecting means for detecting an AC (alternating current) component in a specific frequency region during said sensing period from said voltage signal derived from the ion current-to-voltage converting means, and for outputting a judgment signal representative of a combustion condition.

2. A combusting condition detecting apparatus as claimed in claim 1 wherein said ion current-to-voltage converting means varies at least a gain of the voltage signal supplied to the AC component detecting means in response to a low frequency component value of the ion current.

3. A combusting condition detecting apparatus as claimed in claim 1 wherein a plurality of said ion current-to-voltage converting means are provided in correspondence with different cylinders.

4. A combusting condition detecting apparatus as claimed in claim 1 wherein said sensing period setting means defines a combusting condition sensing period by detecting a period during which the output signal from the filter means has a value higher than, or equal to a preselected value, and outputs a misfire judging signal based upon whether or not the output signal from the filter means becomes higher than, or equal to said preselected value.

* * * * *